(12) United States Patent
    Kato

(10) Patent No.: US 11,593,299 B2
(45) Date of Patent: Feb. 28, 2023

(54) DATA ANALYSIS DEVICE, DATA ANALYSIS METHOD AND DATA ANALYSIS PROGRAM

(71) Applicant: NEC Corporation, Tokyo (JP)

(72) Inventor: Kyoko Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 716 days.

(21) Appl. No.: 16/495,145

(22) PCT Filed: Mar. 2, 2018

(86) PCT No.: PCT/JP2018/008007
    § 371 (c)(1),
    (2) Date: Sep. 18, 2019

(87) PCT Pub. No.: WO2018/180197
    PCT Pub. Date: Oct. 4, 2018

(65) Prior Publication Data
    US 2020/0019855 A1    Jan. 16, 2020

(30) Foreign Application Priority Data
    Mar. 28, 2017  (JP) .............................. JP2017-062119

(51) Int. Cl.
    *G06N 3/08*       (2006.01)
    *G06F 16/00*      (2019.01)

(52) U.S. Cl.
    CPC .............. *G06F 16/00* (2019.01); *G06N 3/08* (2013.01)

(58) Field of Classification Search
    CPC ...................................................... G06N 3/08
    See application file for complete search history.

(56) References Cited

U.S. PATENT DOCUMENTS 10,410,113 B2 *  9/2019  Clayton ............... G06N 3/0445
10,460,251 B2 * 10/2019  Okanohara .......... G06N 3/0445
(Continued)

FOREIGN PATENT DOCUMENTS

CN       1511312 A    7/2004
CN     101118434 A    2/2008
(Continued)

OTHER PUBLICATIONS

Japanese Office Action for JP Application No. 2019-509052 dated Jul. 14, 2020 with English Translation.
(Continued)

*Primary Examiner* — Minh Chau Nguyen
(74) *Attorney, Agent, or Firm* — Sughrue Mion, PLLC

(57) ABSTRACT

A data analysis device 10 comprises: a frequency analysis unit 11 that performs frequency analysis, under a predetermined condition, on each piece of a plurality of training data pieces including a plurality of class training data pieces some of which have been assigned a label indicating the data class; a cluster analysis unit 12 that clusters the frequency analyzed training data pieces into a number of classes of frequency analyzed training data; a computation unit 13 that computes, on the basis of the clusters, the degree to which frequency analyzed training data pieces assigned the same label are not included in the same cluster; and a selection unit 14 that selects, as a clustering model for assigning a label to a training data piece, clustering results according to the cluster analysis unit 12 when the smallest degree was computed, from among the plurality of computed degrees.

13 Claims, 10 Drawing Sheets

(56) References Cited

U.S. PATENT DOCUMENTS

| | | | | |
|---|---|---|---|---|
| 10,832,333 B1* | 11/2020 | Spader | ............... | G06V 20/64 |
| 11,080,556 B1* | 8/2021 | Gillian | ............... | G01S 7/412 |
| 2008/0033898 A1 | 2/2008 | Hashimoto | | |
| 2014/0201126 A1* | 7/2014 | Zadeh | ............... | A61B 5/165 |
| | | | | 706/52 |
| 2017/0188443 A1 | 6/2017 | Nakahara et al. | | |
| 2022/0005291 A1* | 1/2022 | Konrardy | ............... | G07C 5/008 |

FOREIGN PATENT DOCUMENTS

| | | | |
|---|---|---|---|
| JP | 2005-115569 A | 4/2005 | |
| JP | 2006-072659 A | 3/2006 | |
| JP | 4003086 B2 | 11/2007 | |
| JP | 2008-181294 A | 8/2008 | |
| JP | 2009146149 A | 7/2009 | |
| JP | 2010117336 A | 5/2010 | |
| JP | 4762088 B2 | 8/2011 | |
| JP | 2016-062524 A | 4/2016 | |
| JP | 2016-219879 A | 12/2016 | |
| WO | 2015/062738 A1 | 5/2015 | |
| WO | 2015/182317 A1 | 12/2015 | |

OTHER PUBLICATIONS

International Search Report for PCT Application No. PCT/JP2018/008007, dated May 29, 2018.
CN Office Action for CN Application No. 201880022162.1, dated Sep. 2, 2022 with English Translation.

\* cited by examiner

DATA ANALYSIS DEVICE, DATA ANALYSIS METHOD AND DATA ANALYSIS PROGRAM

This application is a National Stage Entry of PCT/JP2018/008007 filed on Mar. 2, 2018, which claims priority from Japanese Patent Application 2017-062119 filed on Mar. 28, 2017, the contents of all of which are incorporated herein by reference, in their entirety.

TECHNICAL FIELD

The present invention relates to a data analysis device, a data analysis method, and a data analysis program.

BACKGROUND ART

A technology for automatically detecting an anomaly in a device to be observed such as a sensor on the basis of vibration data captured by a sensor or the like is in demand. Note that the vibration data corresponds to, for example, data that varies with time.

In general, data captured by such a sensor tends to become long time-series data. In order to, for example, extract useful information from such long time-series data and detect an anomaly, knowledge about fields such as statistical analysis and machine learning is required. It is also required that various manipulations be repeatedly performed on data.

In addition, for analysis of such vibration data, it is known that frequency analysis of vibration data with, for example, a fast Fourier transform (FFT) is effective.

For example, it is highly likely that an administrator of a device can determine whether the device is in a normal state or abnormal state by examining captured vibration data. This raises the possibility of enabling automatic detection of the abnormal state of the device with machine learning performed to allow the administrator's task of determining the state to be automated by a detection model.

However, the machine learning requires assignment of either a "normal" label or an "abnormal" label to a large number of pieces of vibration data. That is, performing the machine learning brings about the problem of the need to perform a costly labeling task.

Further, it is expected that performing the frequency analysis on the large number of pieces of vibration data will bring about an increase in accuracy of the detection model. However, simply performing the frequency analysis still makes it difficult to extract useful information from long time-series data such as data captured by a sensor and find a useful analysis condition.

Patent Literature 1 discloses an image processing device including a computation unit that scans each region having a predetermined size in each frame constituting a moving image to compute a degree of importance for each region, and a clustering unit that clusters the regions on the basis of the degrees of importance to generate at least one region cluster.

Further, Patent Literature 2 discloses a data processing system including a learning means that builds a model through learning of a relation between a supervised label assigned to at least one region on an learning image and an image represented in the region. The data processing system disclosed in Patent Literature 2 includes a detecting means that receives an detection image different from the learning image as an input and detects respective regions containing an object on the basis of the model from an detection image subjected to a predetermined image processing and an detection image not subjected to the image processing.

Further, Patent Literature 3 discloses a process anomaly diagnosis device capable of narrowing down, in advance, a region where a threshold that separates data into normal data and abnormal data is located to ensure that, even in the worst case, the threshold is set in a region where the threshold is possibly located and clustering the normal data and the abnormal data with high reliability.

Further, Patent Literature 4 discloses an evaluation method that allows a reduction in arithmetic processing load applied when a diagnosis is performed on whether any anomaly occurs in mechanical equipment including one or a plurality of sliding members and achieves increases in speed and reliability of a diagnosis task. In the evaluation method disclosed in Patent Literature 4, measured frequency spectrum data is generated from sounds or vibrations occurred from the mechanical equipment.

The use of the technology disclosed in Patent Literature 2 allows the costly labeling task to be efficiently performed. Further, the use of any one of the technologies disclosed in Patent Literature 1 and Patent Literature 3 to 4 allows useful information to be extracted from long time-series data such as data captured by a sensor and further allows a useful analysis condition to be found.

CITATION LIST

Patent Literature

Patent Literature 1: Japanese Patent Application Laid-Open No. 2016-219879
Patent Literature 2: Japanese Patent Application Laid-Open No. 2016-062524
Patent Literature 3: Japanese Patent No. 4762088
Patent Literature 4: Japanese Patent No. 4003086

SUMMARY OF INVENTION

Technical Problem

In Patent Literature 2, a description has been given of a reduction in burden of assigning a label to learning image, but no description has been given of an increase in accuracy of a model generated by devised learning processing. Similarly, in Patent Literature 1 and Patent Literature 3 to 4, no description has been given of an increase in accuracy of a model generated by devised learning processing.

Object of Invention

Therefore, it is an object of the present invention to provide a data analysis device, a data analysis method, and a data analysis program that solve the above-described problem and allow an increase in accuracy of a model generated by learning processing.

Solution to Problem

A data analysis device according to present invention includes a frequency analysis unit configured to perform frequency analysis, under a predetermined condition, on each piece of a plurality of training data pieces including a plurality of class training data pieces some of which have been assigned a label indicating the data class, a cluster analysis unit configured to cluster the frequency analyzed training data pieces into a number of classes of frequency analyzed training data, a computation unit configured to compute, on the basis of the clusters, the degree to which frequency analyzed training data pieces assigned the same label are not included in the same cluster, and a selection unit configured to select, as a clustering model for assigning a label to a training data piece, clustering results according to the cluster analysis unit when the smallest degree was computed, from among the plurality of degrees computed when the frequency analysis unit performed frequency analysis of the each of the plurality of class training data pieces under a plurality of conditions.

A data analysis method according to the present invention includes performing frequency analysis, under a predetermined condition, on each piece of a plurality of training data pieces including a plurality of class training data pieces some of which have been assigned a label indicating the data class, clustering the frequency analyzed training data pieces into a number of classes of frequency analyzed training data, computing, on the basis of the clusters, the degree to which frequency analyzed training data pieces assigned the same label are not included in the same cluster, and selecting, as a clustering model for assigning a label to a training data piece, clustering results made when the smallest degree was computed, from among the plurality of degrees computed when the frequency analysis is performed of the each of the plurality of class training data pieces under a plurality of conditions.

A data analysis program according to the present invention causes a computer to execute frequency analysis processing of performing frequency analysis, under a predetermined condition, on each piece of a plurality of training data pieces including a plurality of class training data pieces some of which have been assigned a label indicating the data class, cluster analysis processing of clustering the frequency analyzed training data pieces into a number of classes of frequency analyzed training data, computation processing of computing, on the basis of the clusters, the degree to which frequency analyzed training data pieces assigned the same label are not included in the same cluster, and selection processing of selecting, as a clustering model for assigning a label to a training data piece, clustering results made when the smallest degree was computed, from among the plurality of degrees computed when the frequency analysis is performed of the each of the plurality of class training data pieces under a plurality of conditions.

Advantageous Effects of Invention

According to the present invention, it is possible to increase the accuracy of the model generated by the learning processing.

DESCRIPTION OF EMBODIMENTS

Exemplary Embodiment 1

Figure 1:
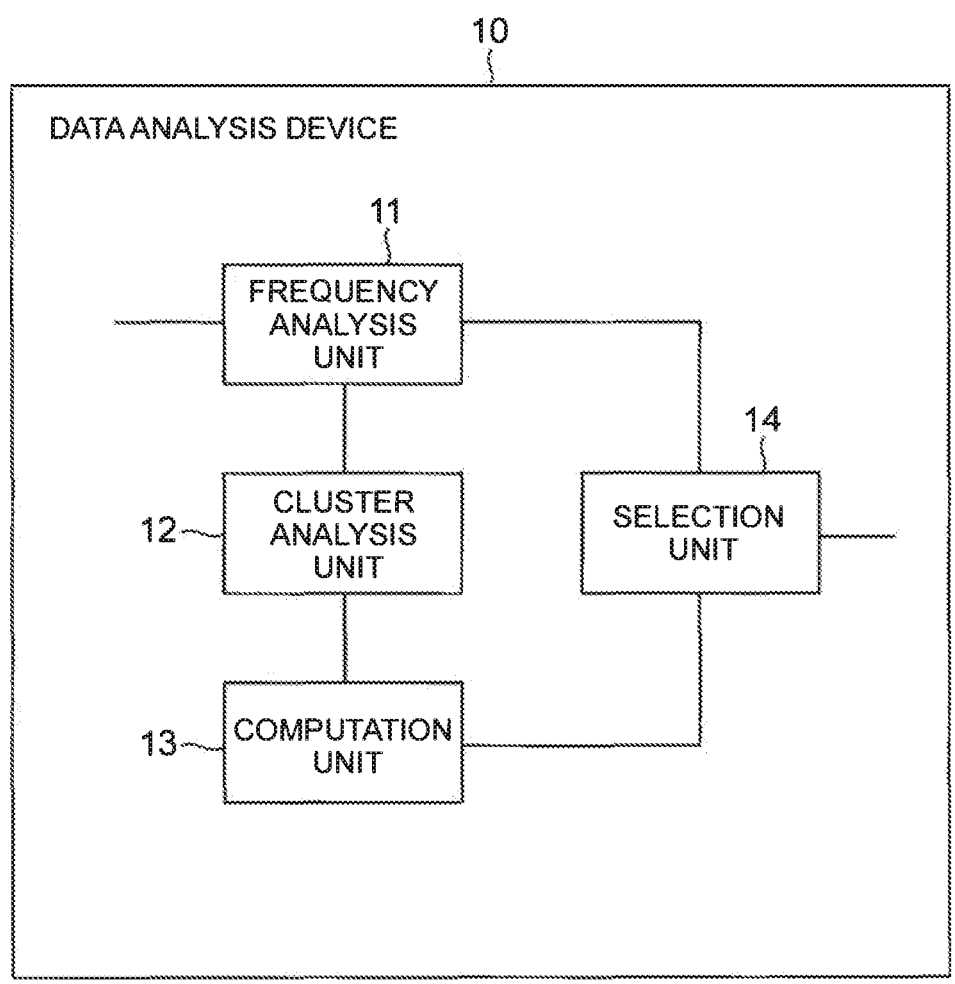
FIG. 1 is a block diagram showing an exemplary configuration of a first exemplary embodiment of a data analysis device according to the present invention.

Hereinafter, a description will be given of exemplary embodiments of the present invention with reference to the drawings. FIG. 1 is a block diagram showing an exemplary configuration of a first exemplary embodiment of a data analysis device according to the present invention. A data analysis device 10 according to present invention includes a frequency analysis unit 11 (for example, a learning frequency analysis unit 121) configured to perform frequency analysis, under a predetermined condition, on each piece of a plurality of training data pieces including a plurality of class training data pieces some of which have been assigned a label indicating the data class, a cluster analysis unit 12 (for example, a clustering processing unit 122) configured to cluster the frequency analyzed training data pieces into a number of classes of frequency analyzed training data, a computation unit 13 (for example, a misclassification rate computation unit 128) configured to compute, on the basis of the clusters, the degree to which frequency analyzed training data pieces assigned the same label are not included in the same cluster, and a selection unit 14 (for example, an optimum condition selection unit 123) configured to select, as a clustering model for assigning a label to a training data piece, clustering results according to the cluster analysis unit 12 when the smallest degree was computed, from among the plurality of degrees computed when the frequency analysis unit 11 performed frequency analysis of the each of the plurality of class training data pieces under a plurality of conditions.

Figure 2:
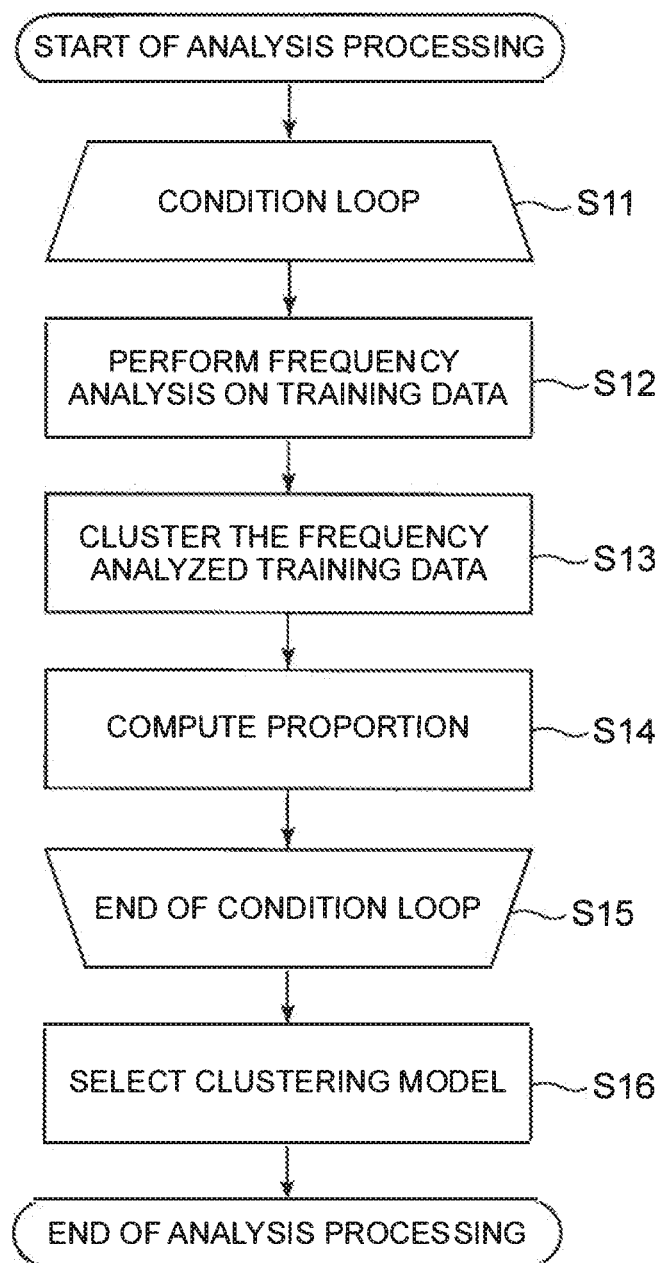
FIG. 2 is a flowchart showing an operation of analysis processing by the data analysis device 10 of the first exemplary embodiment.

Hereinafter, a description will be given of analysis processing to be performed by the data analysis device 10. FIG. 2 is a flowchart showing an operation of the analysis processing by the data analysis device 10 of the first exemplary embodiment.

First, the frequency analysis unit 11 extracts a predetermined condition under which the frequency analysis has yet to be performed from among designated conditions. That is, the frequency analysis unit 11 enters a condition loop (step S11).

The frequency analysis unit 11 performs frequency analysis, under a predetermined condition, on each piece of a plurality of training data pieces including a plurality of class training data pieces some of which have been assigned a label indicating the data class (step S12).

Next, the cluster analysis unit 12 clusters the frequency analyzed training data pieces into a number of classes of frequency analyzed training data (step S13).

Next, the computation unit 13 computes, on the basis of the clusters, the degree to which frequency analyzed training data pieces assigned the same label are not included in the same cluster (step S14).

The data analysis device 10 repeatedly performs the processing in step S12 to step S14 while there remains a condition under which the frequency analysis has yet to be performed among the designated conditions. The processing in step S12 to step S14 is performed under each of the designated conditions and repeated as many times as the number of the designated conditions.

When the frequency analysis has been performed under all the designated conditions for frequency analysis, the data analysis device 10 exits the condition loop (step S15).

Next, the selection unit 14 selects, as a clustering model for assigning a label to a training data piece, clustering results according to the cluster analysis unit 12 when the smallest degree was computed, from among the plurality of computed degrees (step S16). After the selection, the data analysis device 10 brings the analysis processing to an end.

Such a configuration allows the data analysis device to increase accuracy of a model generated by learning processing.

The data analysis device 10 may further include a learning unit (for example, a learning unit 127) configure to generate a determination model of data included in a predetermined class by performing learning processing using the clustering model that has been selected.

Such a configuration allows the data analysis device to generate a more accurate model by performing the learning processing.

The data analysis device 10 may further include a storage unit (for example, a condition storage unit 130) configured to store a condition associated with the clustering model that has been selected.

Such a configuration allows the data analysis device to manage an optimal condition for frequency analysis.

The data analysis device 10 may further include a determination unit (for example, the determination unit 163) configured to determine whether input data corresponds to data included in the predetermined class, the frequency analysis unit 11 may perform the frequency analysis on the input data under the condition stored in the storage unit, and the determination unit may determine whether the frequency analyzed input data corresponds to the data included in the predetermined class using the determination model of data included in a predetermined class generated by the learning unit.

Such a configuration allows the data analysis device to determine the type of input data using a highly-accurate model.

Further, the learning unit may perform the learning processing using data that results from converting each of the frequency analyzed training data pieces into a matrix.

Such a configuration allows the data analysis device to generate data suitable for an algorithm of the learning processing.

Further, the learning processing may be performed in accordance with a deep learning algorithm.

Such a configuration allows the data analysis device to generate a more accurate model by performing the learning processing.

Exemplary Embodiment 2

Description of Configuration

Figure 3:
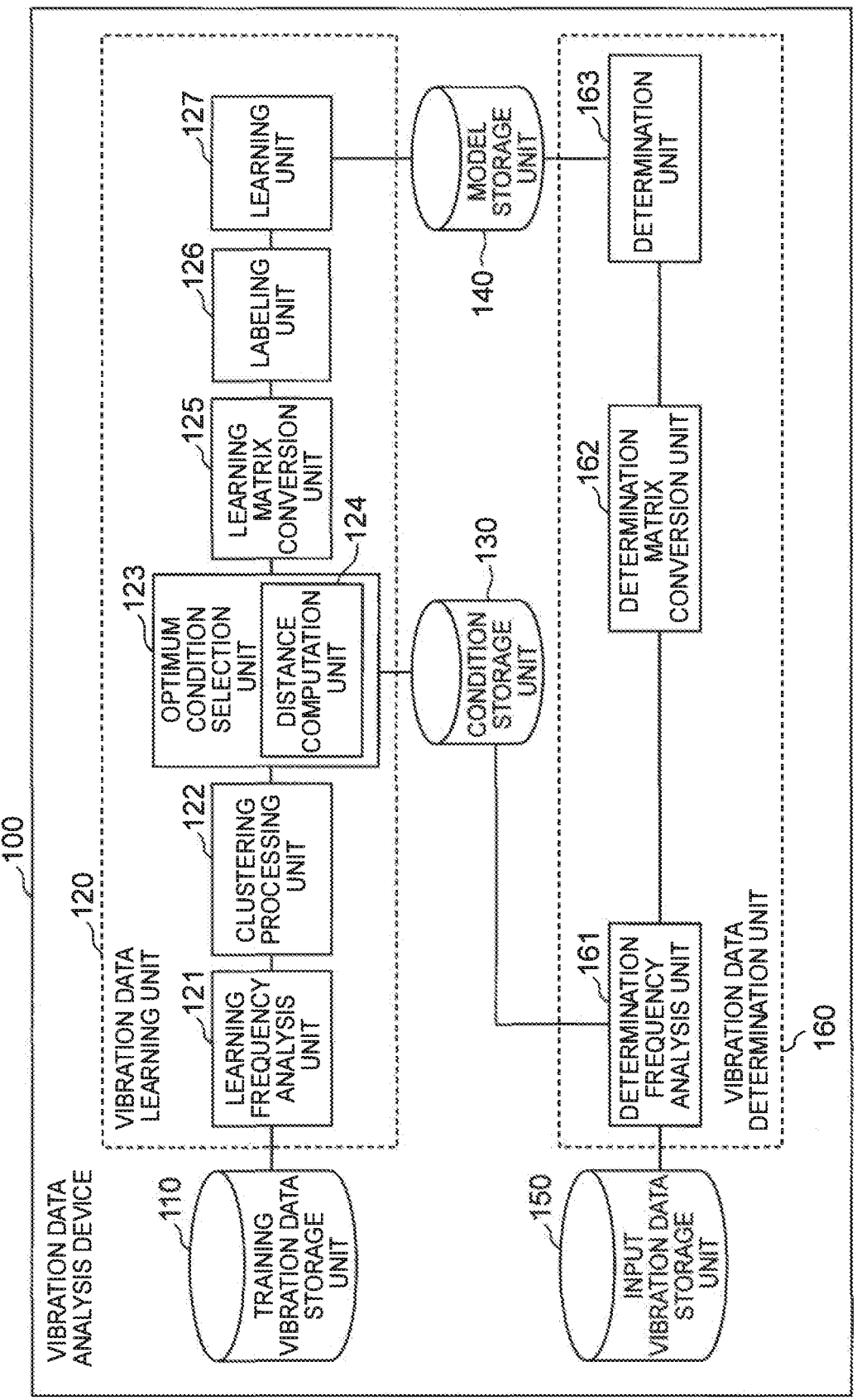
FIG. 3 is a block diagram showing an exemplary configuration of a second exemplary embodiment of a vibration data analysis device according to the present invention.

Hereinafter, a description will be given of a second exemplary embodiment of the present invention with reference to the drawings. FIG. 3 is a block diagram showing an exemplary configuration of the second exemplary embodiment of a vibration data analysis device according to the present invention.

The vibration data analysis device of the present exemplary embodiment obtains a spectrogram by performing frequency analysis on a vibration data set with respect to time. Next, the vibration data analysis device generates an anomaly detection model by performing machine learning using the spectrogram thus obtained.

Specifically, the vibration data analysis device of the present exemplary embodiment performs comprehensive frequency analysis on the vibration data set under various conditions in terms of an analysis target range, frequency, and the like other than time. The vibration data analysis device performs the frequency analysis under each of the conditions and then clusters the frequency analyzed data set into two clusters.

The vibration data analysis device then assigns either a "normal" label or an "abnormal" label to the spectrogram on the basis of an optimum clustering result. The use of the above method allows the vibration data analysis device of the present exemplary embodiment to generate a highly-accurate anomaly detection model while efficiently performing the labeling.

As shown in FIG. 3, the vibration data analysis device 100 includes a training vibration data storage unit 110, a vibration data learning unit 120, a condition storage unit 130, a model storage unit 140, an input vibration data storage unit 150, and a vibration data determination unit 160.

The vibration data analysis device 100 is a device that analyzes vibration data. The vibration data analysis device 100 is, for example, a personal computer (PC). Further, the vibration data analysis device 100 may be a server, a smartphone, or the like.

Further, the vibration data analysis device 100 may be constituted by one terminal or may be constituted by a plurality of terminals. For example, the vibration data learning unit 120 and the vibration data determination unit 160 may be included in the same terminal, or may be separately included in different terminals.

The training vibration data storage unit 110 has a capability of storing a vibration data group (time-series data set) that is time-series data to be used in machine learning. For example, the training vibration data storage unit 110 stores time-series data containing numerical values in a comma-separated values (CSV) file format for each target data. Note that the training vibration data storage unit 110 is a general storage device.

As shown in FIG. 3, the vibration data learning unit 120 includes a learning frequency analysis unit 121, a clustering processing unit 122, an optimum condition selection unit 123, a learning matrix conversion unit 125, a labeling unit 126, and a learning unit 127.

The vibration data learning unit 120 performs time-frequency analysis on training vibration data held in the training vibration data storage unit 110. Next, the vibration data learning unit 120 generates an anomaly detection model by performing supervised machine learning using the data subjected to the time-frequency analysis (hereinafter, referred to as time-frequency analyzed data).

The learning frequency analysis unit 121 has a capability of generating the time-frequency analyzed data by performing the time-frequency analysis on the time-series data set (training vibration data set) on the basis of a condition group prepared in advance.

The condition for frequency analysis is, for example, a combination of an analysis target range, a time condition, and a frequency condition. The analysis target range is a condition for extracting an analysis target range with respect to time. The analysis target range defines a time range to be analyzed in the training vibration data.

For example, "time 0 to time 2" or "time 10 to time 30" is designated as the analysis target range. Note that the analysis target range is pre-defined by a user or system.

The time condition is a condition of a time axis when the range designated as the analysis target range is analyzed. For example, the time condition indicates the number of segments obtained by dividing the time axis such as four or eight. Note that the time condition is pre-defined by the user or system.

The frequency condition is a condition of a frequency axis when the range designated as the analysis target range is analyzed. For example, the frequency condition indicates the number of bands such as 4, 8, or 12, or a bandwidth. That is, the frequency condition indicates the number of segments obtained by dividing the frequency axis. The frequency condition is pre-defined by the user or system.

Figure 4:
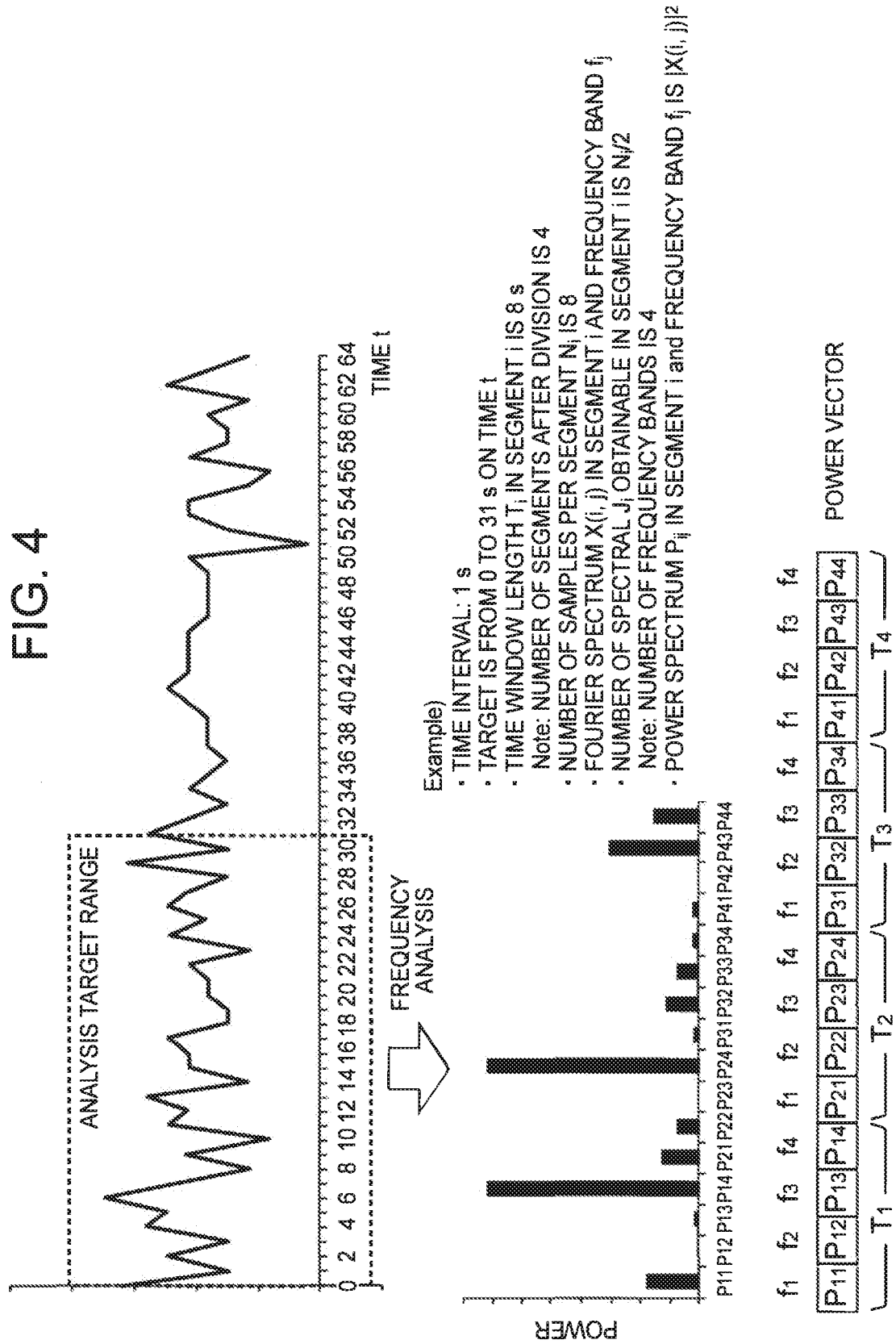
FIG. 4 is an explanatory diagram showing an example of time-frequency analysis processing to be performed by a learning frequency analysis unit 121.

FIG. 4 is an explanatory diagram showing an example of time-frequency analysis processing to be performed by the learning frequency analysis unit 121. FIG. 4 shows training vibration data to be processed at the top. A rectangle defined by dotted-lines shown in the top of FIG. 4 is the range designated as the analysis target range.

The learning frequency analysis unit 121 applies a fast Fourier transform on each of the segments, whose number is indicated by the time condition, of data in the range designated as the analysis target range, for example. Next, the learning frequency analysis unit 121 computes a power integrated value from a value output as a result of the fast Fourier transform and generates a power vector.

FIG. 4 shows a graph on which the time-frequency analyzed data generated by the learning frequency analysis unit 121 is plotted at the middle. $P_{ij}$ on an axis of abscissas denotes a power spectrum in a segment i and a frequency band $f_j$. An axis of ordinate represents a value of each power spectrum (power). Note that the other conditions for time-frequency analysis are specified in the example shown in the middle of FIG. 4.

FIG. 4 shows the power vector generated by the learning frequency analysis unit 121 at the bottom. $T_i$ denotes a time window length in the segment i. As shown in the bottom of FIG. 4, the power vector is composed of power spectra.

The clustering processing unit 122 has a capability of clustering the training vibration data set into two clusters, normal data and abnormal data, for each of the conditions for frequency analysis on the basis of the time-frequency analyzed data.

A clustering method used by the clustering processing unit 122 is, for example, the k-means method. Note that the clustering processing unit 122 may perform the clustering using a method other than the k-means method.

The optimum condition selection unit 123 has a capability of selecting, as the optimum model, a clustering model having the largest distance between centers of clusters. The optimum condition selection unit 123 stores, in the condition storage unit 130, the optimum condition that is a condition for frequency analysis associated with the clustering model that has been selected.

The optimum condition selection unit 123 includes a distance computation unit 124. The distance computation unit 124 has a capability of computing a distance between the centers of clusters. The distance computation unit 124 computes, for example, a Euclidean distance as the distance. Note that the distance computation unit 124 may compute a distance other than the Euclidean distance.

Figure 5:
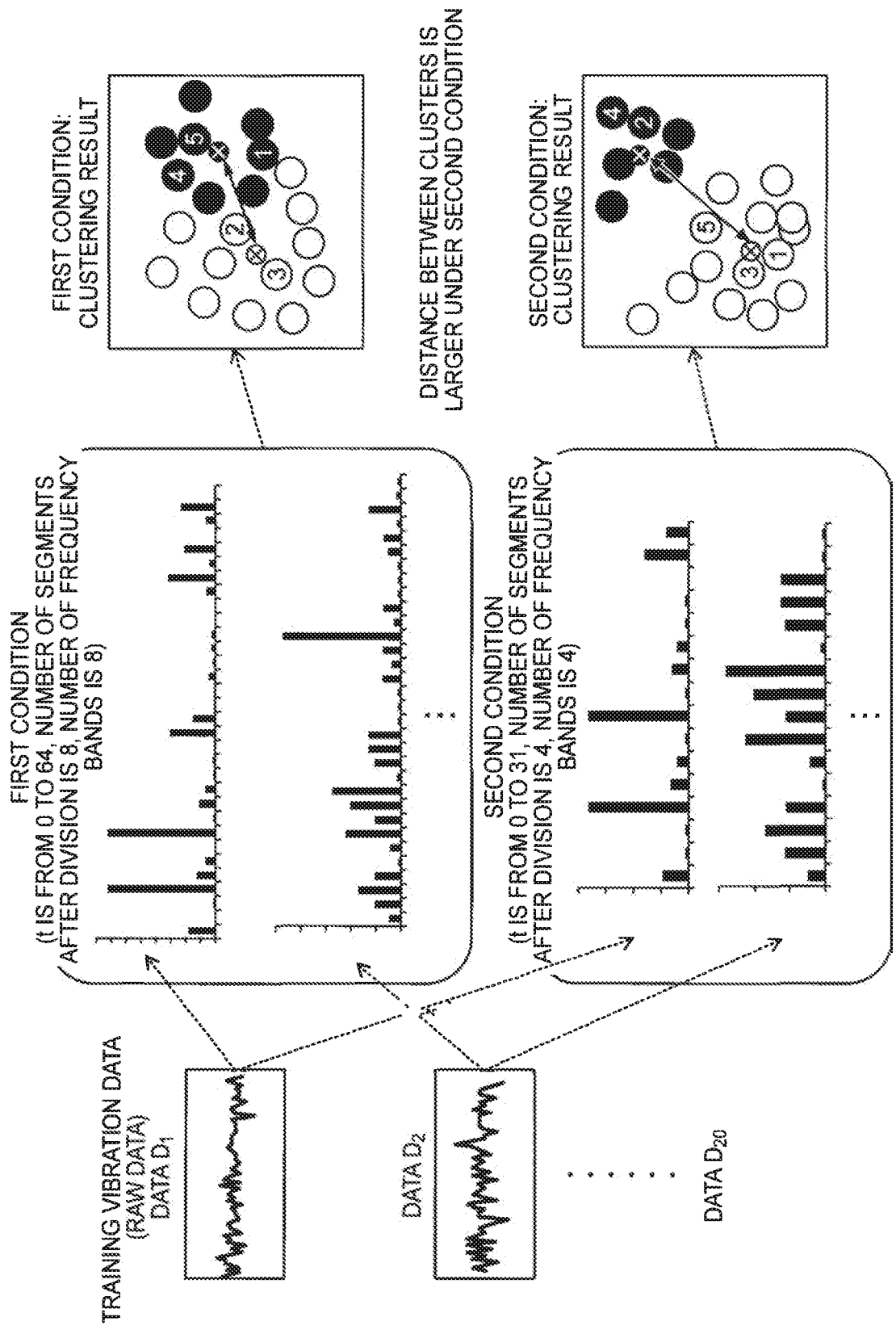
FIG. 5 is an explanatory diagram showing an example of distance computation processing to be performed by a distance computation unit 124.

FIG. 5 is an explanatory diagram showing an example of distance computation processing to be performed by the distance computation unit 124. FIG. 5 shows training vibration data to be processed at the left. The training vibration data to be processed is constituted by 20 pieces of data $D_1$ to $D_{20}$. Further, FIG. 5 shows a result of time-frequency analysis performed by the learning frequency analysis unit 121 at the middle.

FIG. 5 shows results of generating a clustering model by the clustering processing unit 122 at the right. For example, "first condition: clustering result" in the right of FIG. 5 represents a result of clustering, by the clustering processing unit 122, the result of time-frequency analysis under the first condition shown in the middle of FIG. 5 into data represented by white circles and data represented by black circles.

On the basis of the result of the clustering performed by the clustering processing unit 122, the distance computation unit 124 computes the distance between the centers of the clusters. As shown in the right of FIG. 5, the distance between the clusters is larger under the second condition than under the first condition. That is, the second condition is more preferable.

The learning matrix conversion unit 125 has a capability of converting the time-frequency analyzed data into a matrix suitable for a learning algorithm. For example, when the learning unit 127 uses a convolutional neural network (CNN) as the learning algorithm, the learning matrix conversion unit 125 converts the time-frequency analyzed data into an image.

Figure 6:
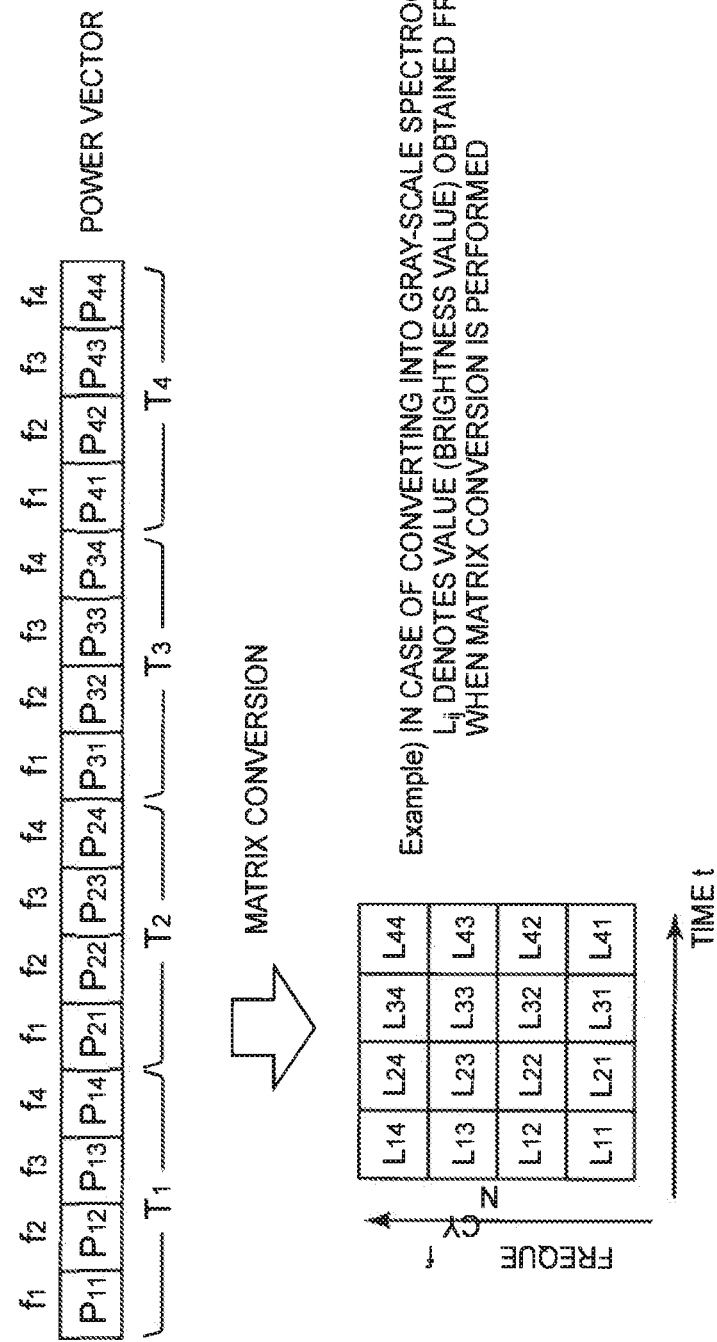
FIG. 6 is an explanatory diagram showing an example of matrix conversion processing to be performed by a learning matrix conversion unit 125.

FIG. 6 is an explanatory diagram showing an example of matrix conversion processing to be performed by the learning matrix conversion unit 125. In the example shown in FIG. 6, the learning matrix conversion unit 125 converts the power vector into a gray-scale spectrogram image. Note that $L_{ij}$ denotes a value (brightness value) obtained from $P_{ij}$ when the matrix conversion is performed.

Although FIG. 6 shows an example in which the power vector is converted into a gray-scale image, the learning matrix conversion unit 125 may convert the power vector into a color image.

The labeling unit 126 has a capability of assigning either the "normal" label or the "abnormal" label to the time-frequency analyzed data converted into a matrix.

In many cases, abnormal data is usually less in volume than normal data in the training vibration data set. Therefore, when either the "normal" label or the "abnormal" label is given, the labeling unit 126 may assign the "abnormal" label to data included in a cluster having a smaller number of elements and the "normal" label to data included in a cluster having a larger number of elements.

Note that the labeling itself may be performed manually. For such manual labeling, for example, only representative data, such as data located at the center of a cluster, is visually recognized, and then either the "normal" label or the "abnormal" label is assigned to the data.

The learning unit 127 has a capability of performing supervised machine learning using the time-frequency analyzed data labeled and converted into a matrix. The learning unit 127 generates the anomaly detection model by performing the supervised machine learning.

A learning algorithm of the supervised machine learning to be performed by the learning unit 127 is, for example, a deep learning algorithm such as a convolutional neural network (CNN). However, the learning algorithm may be an algorithm other than the deep learning algorithm.

The condition storage unit 130 has a capability of holding the optimum condition for time-frequency analysis selected by the optimum condition selection unit 123 of the vibration data learning unit 120. Note that the condition storage unit 130 is a general storage device as in the case of the training vibration data storage unit 110.

The model storage unit 140 has a capability of holding a learned anomaly detection model generated by the vibration data learning unit 120. Note that the model storage unit 140 is a general storage device as in the case of the training vibration data storage unit 110.

The input vibration data storage unit 150 has a capability of storing a vibration data group to be determined. Note that the input vibration data storage unit 150 is a general storage device as in the case of the training vibration data storage unit 110.

As shown in FIG. 3, the vibration data determination unit 160 includes a determination frequency analysis unit 161, a determination matrix conversion unit 162, and a determination unit 163.

The vibration data determination unit 160 performs time-frequency analysis on input vibration data held in the input vibration data storage unit 150 and converts the input vibration data into a matrix. Next, the vibration data determination unit 160 determines whether the input vibration data is normal data or abnormal data by inputting the time-frequency analyzed data converted into a matrix to the anomaly detection model.

The determination frequency analysis unit 161 has the same capability as the capability of the learning frequency analysis unit 121. The determination frequency analysis unit 161 retrieves the condition stored in the condition storage unit 130 and uses the condition as a condition for time-frequency analysis.

The determination matrix conversion unit 162 has the same capability as the capability of the learning matrix conversion unit 125.

The determination unit 163 has a capability of determining whether the input vibration data to be determined is normal data or abnormal data by inputting the time-frequency analyzed data converted into a matrix into the anomaly detection model retrieved from the model storage unit 140.

Description of Operation

Hereinafter, a description will be given of an operation of the vibration data analysis device 100 of the present exemplary embodiment with reference to FIG. 7 to FIG. 8. The operation of the vibration data analysis device 100 is divided into two: an operation in a learning phase and an operation in a determination phase.

In the learning phase, the vibration data analysis device 100 generates the anomaly detection model by learning a relation between vibration data to be learned, and normal data and abnormal data. On the other hand, in the determination phase, the vibration data analysis device 100 determines whether vibration data to be determined is normal data or abnormal data by inputting the vibration data to be determined into the anomaly detection model.

First, a description will be given of the operation in the learning phase of the vibration data analysis device 100 of the present exemplary embodiment with reference to FIG. 7. FIG. 7 is a flowchart showing an operation of learning processing by the vibration data analysis device 100 of the second exemplary embodiment.

First, the vibration data learning unit 120 retrieves, from the training vibration data storage unit 110, the training vibration data set to be used for learning. The vibration data learning unit 120 reads the training vibration data set that has been retrieved (step S101).

Next, the vibration data learning unit 120 extracts a combination of conditions under which the frequency analysis has yet to be performed from among combinations of the designated conditions for frequency analysis. That is, the vibration data learning unit 120 enters a condition loop (step S102).

Next, the vibration data learning unit 120 extracts training vibration data on which the frequency analysis has yet to be performed from the training vibration data set that has been read. That is, the vibration data learning unit 120 enters a frequency analysis loop (step S103).

The learning frequency analysis unit 121 of the vibration data learning unit 120 generates time-frequency analyzed data such as a power vector by performing time-frequency analysis on target training vibration data under the conditions that have been extracted (step S104). Note that the conditions that have been extracted correspond to a combination of the analysis target range, the time condition, the frequency condition, and the like described above.

The learning frequency analysis unit 121 repeatedly performs the processing in step S104 while there remains training vibration data on which the time-frequency analysis has yet to be performed in the training vibration data set that has been read. The processing in step S104 is performed on each piece of training vibration data and repeated as many times as the number of pieces of training vibration data retrieved in step S101.

When all of the pieces of training vibration data thus retrieved have been subjected to the time-frequency analysis, the learning frequency analysis unit 121 exits the frequency analysis loop (step S105).

Next, the clustering processing unit 122 of the vibration data learning unit 120 clusters the time-frequency analyzed data set into two clusters for each condition (step S106).

Next, the distance computation unit 124 of the optimum condition selection unit 123 of the vibration data learning unit 120 computes a distance L between the centers of the clusters (step S107).

Next, when the distance L computed in step S107 is greater than a maximum value (max(L)), the optimum condition selection unit 123 updates the maximum value to the distance L (max(L)=L). Further, the optimum condition selection unit 123 updates the optimum conditions (analysis target range, time condition, frequency condition) to the conditions for the clustering result from which the distance L is computed (step S108).

The vibration data learning unit 120 repeatedly performs the processing in step S103 to step S108 while there remains a combination of conditions under which the time-frequency analysis has yet to be performed among the combinations of the designated conditions for frequency analysis. The processing in step S103 to step S108 is performed under each combination of conditions and repeated as many times as the number of the combinations of the designated conditions for frequency analysis.

When the time-frequency analysis has been performed under all the combinations of the designated conditions for frequency analysis, the learning frequency analysis unit 121 exits the condition loop (step S109).

Next, the optimum condition selection unit 123 compares the maximum value max(L) of the distance with a preset threshold d to check whether max(L) is less than d (step S110). Note that the threshold d need not be preset.

When max(L) is less than d (True in step S110), the optimum condition selection unit 123 determines that clustering has failed (step S111). The vibration data analysis device 100 terminates the learning processing.

When max(L) is equal to or greater than d (False in step S110), the optimum condition selection unit 123 stores the optimum conditions (analysis target range, time condition, frequency condition) into the condition storage unit 130 (step S112).

Next, the vibration data learning unit 120 extracts time-frequency analyzed data that has yet to be labeled from the time-frequency analyzed data set processed under the optimum conditions that have been stored. That is, the vibration data learning unit 120 enters a labeling loop (step S113).

The learning matrix conversion unit 125 of the vibration data learning unit 120 converts target time-frequency analyzed data processed under the optimum conditions into a matrix suitable for the learning algorithm (step S114).

Next, the labeling unit 126 of the vibration data learning unit 120 classifies pieces of data each converted into a matrix using the clustering model (clustering result) associated with the optimum conditions. Next, the labeling unit 126 assigns either the "normal" label or the "abnormal" label to each piece of data thus classified (step S115).

The vibration data learning unit 120 repeatedly performs the processing in step S114 and step S115 while there remains time-frequency analyzed data that has yet to be labeled in the time-frequency analyzed data set. The processing in step S114 and step S115 is performed for each piece of time-frequency analyzed data and repeated as many times as the number of pieces of training vibration data retrieved in step S101.

When all the pieces of time-frequency analyzed data have been labeled, the vibration data learning unit 120 exits the labeling loop (step S116).

Next, the learning unit 127 performs the supervised machine learning using the training vibration data set (time-frequency analyzed data set converted into a matrix) labeled in step S115 (step S117). The learning unit 127 generates the anomaly detection model by performing the supervised machine learning.

Next, the learning unit 127 stores the anomaly detection model generated in step S117 into the model storage unit 140 (step S118). After the storing, the vibration data analysis device 100 brings the learning processing to an end.

Note that, in the above example, the learning unit 127 automatically takes the clustering model having the largest distance between clusters as the optimum model. However, the optimum condition selection unit 123 may input a clustering model candidate into the learning matrix conversion unit 125 in descending order of distance, and the learning unit 127 may select the optimum model from among a plurality of models.

Next, a description will be given of the operation in the determination phase of the vibration data analysis device 100 of the present exemplary embodiment with reference to FIG. 8. FIG. 8 is a flowchart showing an operation of determination processing by the vibration data analysis device 100 of the second exemplary embodiment.

First, the vibration data determination unit 160 reads the anomaly detection model generated by the learning unit 127 from the model storage unit 140 (step S121).

Next, the vibration data determination unit 160 retrieves an input vibration data set from the input vibration data storage unit 150. The vibration data determination unit 160 reads the input vibration data set thus retrieved (step S122).

Next, the vibration data determination unit 160 reads the optimum conditions selected by the optimum condition selection unit 123 from the condition storage unit 130 (step S123).

Next, the vibration data determination unit 160 extracts input vibration data that has yet to be determined from the input vibration data set that has been read. That is, the vibration data determination unit 160 enters a determination loop (step S124).

The determination frequency analysis unit 161 of the vibration data determination unit 160 generates time-frequency analyzed data such as a power vector by performing time-frequency analysis on target input vibration data under the optimum conditions (analysis target range, time condition, frequency condition) read in step S123 (step S125). Note that the time-frequency analysis processing is the same as the processing in step S104 in the learning phase.

Next, the determination matrix conversion unit 162 of the vibration data determination unit 160 converts the time-frequency analyzed data into a matrix (step S126). Note that the matrix conversion processing is the same as the processing in step S114 in the learning phase.

Next, the determination unit 163 of the vibration data determination unit 160 determines whether the target input vibration data is normal data or abnormal data by inputting the time-frequency analyzed data converted into a matrix in step S126 into the anomaly detection model read in step S121 (step S127).

The vibration data determination unit 160 repeatedly performs the processing in step S125 to step S127 while there remains input vibration data that has yet to be determined in the input vibration data set. The processing in step S125 to step S127 is performed for each piece of input vibration data and repeated as many times as the number of pieces of input vibration data retrieved in step S122.

When all the pieces of input vibration data have been determined, the vibration data determination unit 160 exits the determination loop (step S128). After exiting the determination loop, the vibration data analysis device 100 brings the determination processing to an end. The above processing allows the vibration data analysis device 100 to determine whether vibration data is normal data or abnormal data.

Description of Effect

The learning frequency analysis unit 121 of the vibration data learning unit 120 of the present exemplary embodiment performs frequency analysis on vibration data set that is a set of pieces of time-series data under various conditions (analysis target range, frequency, time, and the like).

The clustering processing unit 122 clusters each training vibration data into two clusters on the basis of the frequency analyzed data for each condition. Next, the optimum condition selection unit 123 selects an optimum clustering model.

Next, the learning matrix conversion unit 125 converts the frequency analyzed data into a matrix compatible with the learning algorithm. Next, the labeling unit 126 assigns either the "normal" label or the "abnormal" label to the frequency analyzed data converted into a matrix using the optimum clustering model that has been selected.

Next, the learning unit 127 generates the anomaly detection model by performing machine learning using the pieces of data assigned the labels. The above configuration allows the vibration data learning unit 120 of the present exemplary embodiment to efficiently perform the labeling. That is, a workload for the labeling is reduced.

Further, since the learning unit 127 learns features extracted in accordance with the combination of an analysis target range, time, frequency, and the like as a factor of determination of whether data is normal data or abnormal data, the anomaly detection model to be generated is increased in accuracy.

Further, the vibration data determination unit 160 of the present exemplary embodiment can detect abnormal vibration data. Furthermore, when the learning unit 127 performs supervised learning in which deep learning is used, the determination unit 163 can grasp features that are more detailed than in the case where only clustering is performed and then make a determination on the input vibration data.

Exemplary Embodiment 3

Description of Configuration

Figure 9:
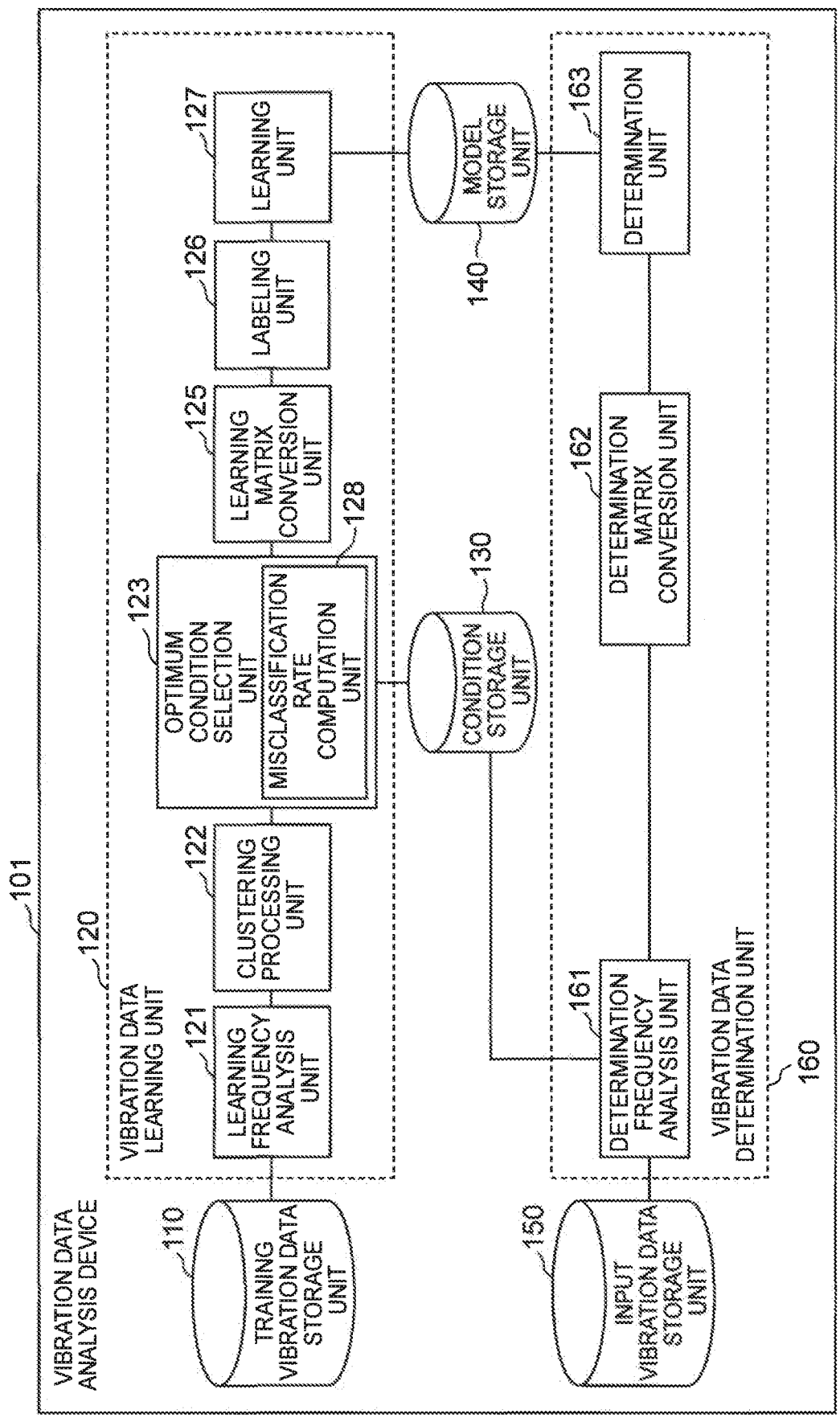
FIG. 9 is a block diagram showing an exemplary configuration of a third exemplary embodiment of the vibration data analysis device according to the present invention.

Hereinafter, a description will be given of a third exemplary embodiment of the present invention with reference to the drawings. FIG. 9 is a block diagram showing an exemplary configuration of a third exemplary embodiment of the vibration data analysis device according to the present invention.

A vibration data analysis device 101 of the present exemplary embodiment is identical in configuration to the vibration data analysis device 100 of the second exemplary embodiment except that the optimum condition selection unit 123 includes a misclassification rate computation unit 128 instead of the distance computation unit 124.

A training vibration data set stored in the training vibration data storage unit 110 of the present exemplary embodiment contains vibration data pre-assigned either the "normal" label or the "abnormal" label. The vibration data learning unit 120 extracts training vibration data that is labeled.

The misclassification rate computation unit 128 of the present exemplary embodiment computes a misclassification rate representing a degree of pieces of data that have been assigned the same label but have not been grouped into the same cluster. The optimum condition selection unit 123 of the present exemplary embodiment selects, as optimum conditions, a combination of conditions under which the misclassification rate thus computed becomes minimum rather than a combination of conditions under which the distance between clusters becomes maximum.

For example, it is assumed that M pieces of vibration data assigned the "normal" label and N pieces of vibration data assigned the "abnormal" label are extracted. When all the "normal" pieces of vibration data exist in the same cluster and all the "abnormal" pieces of vibration data exist in a cluster other than the cluster in which the "normal" pieces of vibration data exist, the misclassification rate computation unit 128 computes the misclassification rate as "0".

Further, when m "normal" pieces of vibration data and n "abnormal" pieces of vibration data are grouped into clusters different from intended clusters, the misclassification rate computation unit 128 computes the misclassification rate as "(m/M)+(n/N)", for example. Note that the misclassification rate computation unit 128 may compute the misclassification rate by any method as long as the misclassification rate represents the degree of pieces of data that have been assigned the same label but have not been grouped into the same cluster.

Note that the optimum condition selection unit 123 of the present exemplary embodiment may determine that clustering has failed when the misclassification rate thus computed is greater than a threshold d.

Description of Operation

Figure 10:
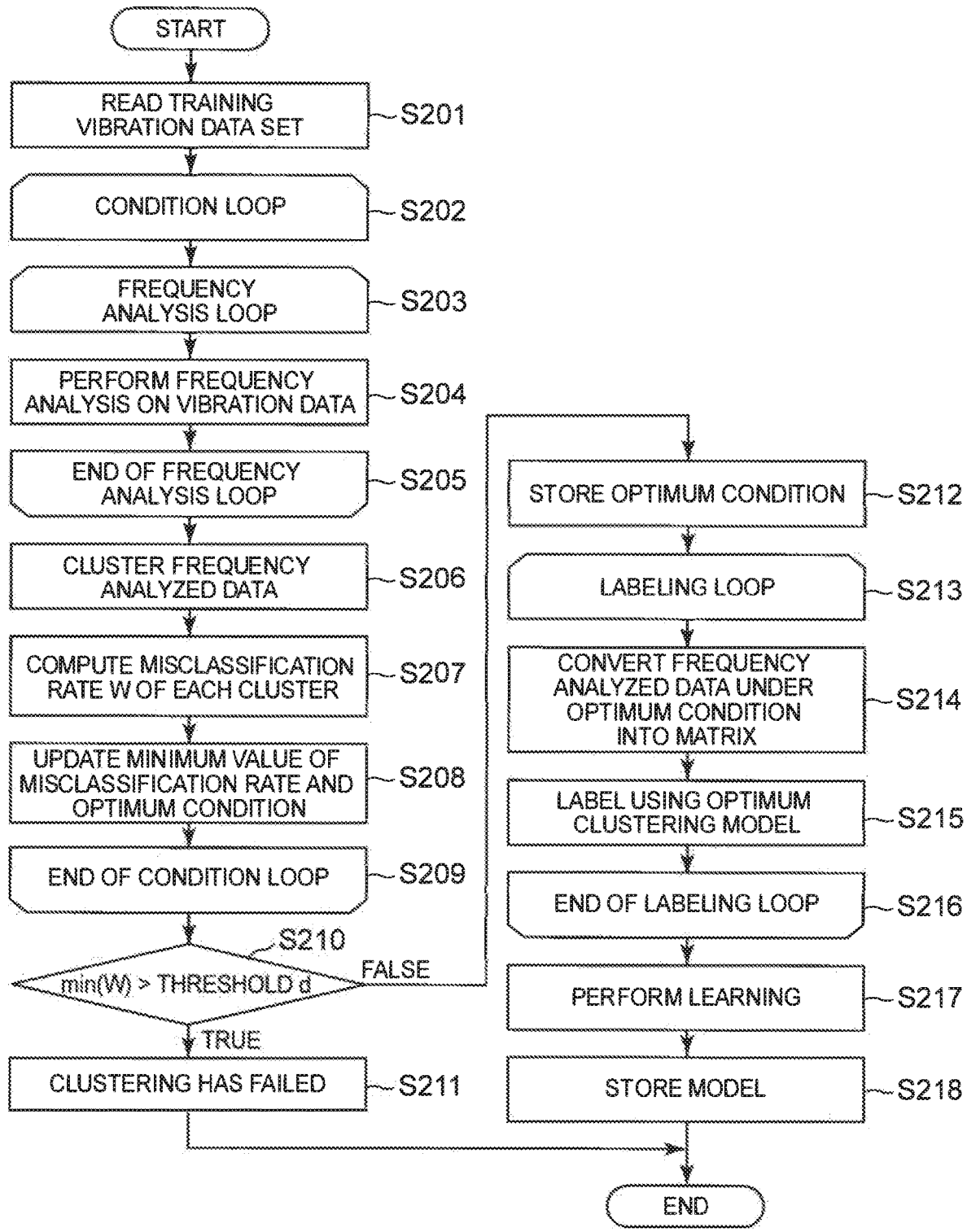
FIG. 10 is a flowchart showing an operation of learning processing by a vibration data analysis device 101 of the third exemplary embodiment.

Hereinafter, a description will be given of an operation in the learning phase of the vibration data analysis device 101 of the present exemplary embodiment with reference to FIG. 10. FIG. 10 is a flowchart showing an operation of learning processing by the vibration data analysis device 101 of the third exemplary embodiment.

Figure 8:
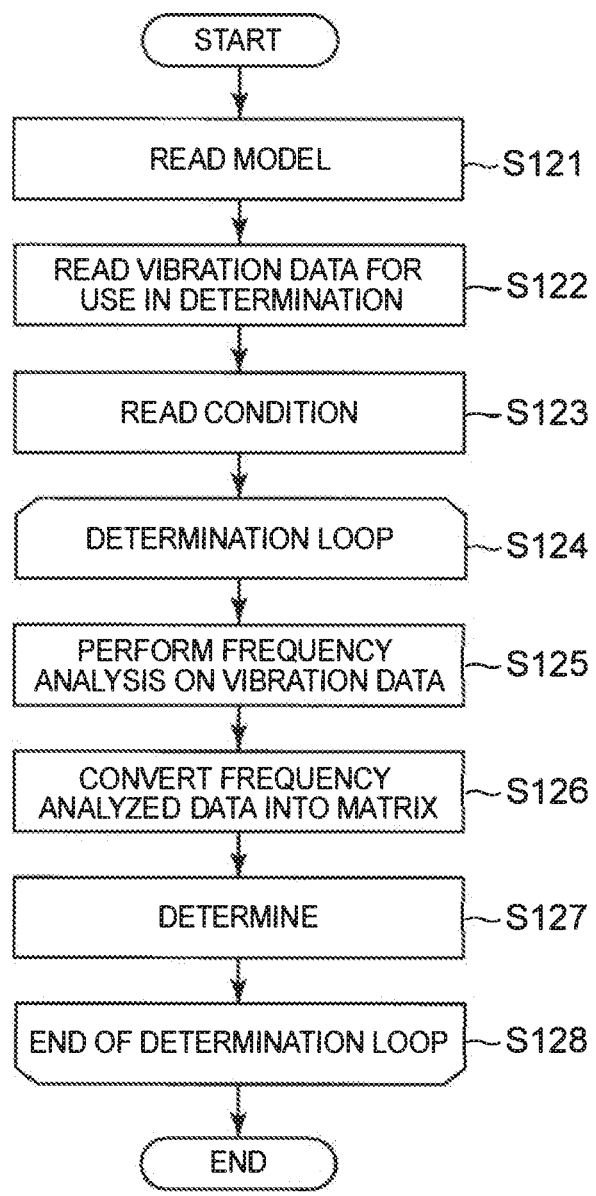
FIG. 8 is a flowchart showing an operation of determination processing by the vibration data analysis device 100 of the second exemplary embodiment.

Note that an operation in the determination phase of the vibration data analysis device 101 of the present exemplary embodiment is the same as the operation of determination processing shown in FIG. 8.

First, the vibration data learning unit 120 retrieves, from the training vibration data storage unit 110, a training vibration data set that has been labeled and is to be used for learning. The vibration data learning unit 120 reads the training vibration data set thus retrieved (step S201).

Figure 7:
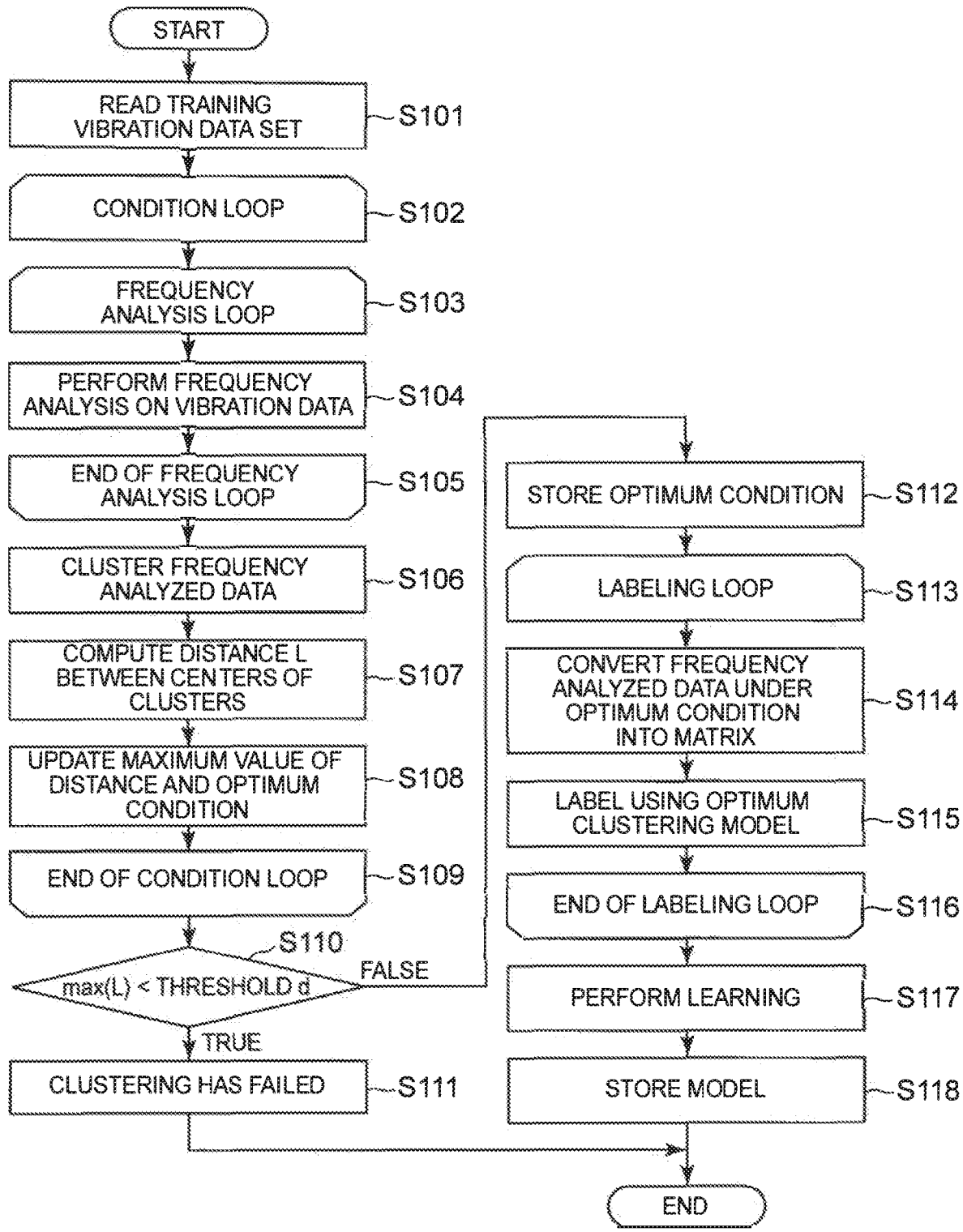
FIG. 7 is a flowchart showing an operation of learning processing by the vibration data analysis device 100 of the second exemplary embodiment.

The processing in step S202 to step S206 is the same as the processing in step S102 to step S106 shown in FIG. 7.

Next, the misclassification rate computation unit 128 of the optimum condition selection unit 123 of the vibration data learning unit 120 computes a misclassification rate W from the clustering result (step S207).

Next, when the misclassification rate W computed in step S207 is less than a minimum value (min(W)), the optimum condition selection unit 123 updates the minimum value to the misclassification rate W (min(W)=W). Further, the optimum condition selection unit 123 updates the optimum conditions (analysis target range, time condition, frequency condition) to the conditions for the clustering result from which the misclassification rate W is computed (step S208).

The processing in step S209 is the same as the processing in step S109 shown in FIG. 7.

Next, the optimum condition selection unit 123 compares the minimum value min(W) of the misclassification rate with the preset threshold d to check whether min(W) is greater than d (step S210). Note that the threshold d need not be preset.

When min(W) is greater than d (True in step S210), the optimum condition selection unit 123 determines that clustering has failed (step S211). The vibration data analysis device 100 terminates the learning processing.

When min(W) is equal to or less than d (False in step S210), the optimum condition selection unit 123 stores the optimum conditions (analysis target range, time condition, frequency condition) into the condition storage unit 130 (step S212).

The processing in step S213 to step S218 is the same as the processing in step S113 to step S118 shown in FIG. 7.

Description of Effect

In the vibration data analysis device 101 of the present exemplary embodiment, the clustering processing unit 122 clusters the pieces of vibration data each pre-assigned a correct label, and the optimum condition selection unit 123 selects the optimum conditions on the basis of the clustering result, allowing a generated anomaly detection model to be increased in accuracy.

The vibration data analysis device of each of the exemplary embodiments is expected to be suitably applied to fields such as failure detection of machine tools.

Note that the data analysis device 10, the vibration data analysis device 100, and the vibration data analysis device 101 of the exemplary embodiments may be each implemented with, for example, a central processing unit (CPU) that executes processing in accordance with a program stored in a non-transitory storage medium. That is, the frequency analysis unit 11, the cluster analysis unit 12, the computation unit 13, the selection unit 14, the learning frequency analysis unit 121, the clustering processing unit 122, the optimum condition selection unit 123, the learning matrix conversion unit 125, the labeling unit 126, the learning unit 127, the determination frequency analysis unit 161, the determination matrix conversion unit 162, and the determination unit 163 may be implemented with, for example, a CPU that executes processing under control of the program.

Further, the training vibration data storage unit 110, the condition storage unit 130, the model storage unit 140, and the input vibration data storage unit 150 may be implemented with, for example, a random access memory (RAM).

Further, each component of the data analysis device 10, the vibration data analysis device 100, and the vibration data analysis device 101 of the exemplary embodiments may be implemented with a hardware circuit. As an example, the frequency analysis unit 11, the cluster analysis unit 12, the computation unit 13, the selection unit 14, the training vibration data storage unit 110, the learning frequency analysis unit 121, the clustering processing unit 122, the optimum condition selection unit 123, the learning matrix conversion unit 125, the labeling unit 126, the learning unit 127, the condition storage unit 130, the model storage unit 140, the input vibration data storage unit 150, the determination frequency analysis unit 161, the determination matrix conversion unit 162, and the determination unit 163 are each implemented with a large scale integration (LSI). Alternatively, all the above-described units may be implemented with a single LSI.

Although the invention of the present application has been described above with reference to the exemplary embodiments and examples, the invention of the present application is not limited to the above-described exemplary embodiments and examples. Various changes that can be understood by those skilled in the art can be made to the configuration and details of the invention of the present application within the scope of the invention of the present application.

This application claims priority based on Japanese Patent Application No. 2017-062119 filed on Mar. 28, 2017, the disclosure of which is incorporated herein in its entirety.

REFERENCE SIGNS LIST

10 Data analysis device
100, 101 Vibration data analysis device
11 Frequency analysis unit
12 Cluster analysis unit
13 Computation unit
14 Selection unit
110 Training vibration data storage unit
120 Vibration data learning unit
121 Learning frequency analysis unit
122 Clustering processing unit
123 Optimum condition selection unit
124 Distance computation unit
125 Learning matrix conversion unit
126 Labeling unit
127 Learning unit
128 Misclassification rate computation unit
130 Condition storage unit
140 Model storage unit
150 Input vibration data storage unit
160 Vibration data determination unit
161 Determination frequency analysis unit
162 Determination matrix conversion unit
163 Determination unit

What is claimed is:

1. A data analysis device comprising:
a memory storing instructions; and
at least one processor configured to process the instructions to:
perform frequency analysis, under each of a plurality of conditions, on a training data set;
cluster each of the frequency analyzed training data set into a predefined group, wherein the frequency analyzed training data set is analyzed under each of the plurality of conditions;
calculate a misclassification rate for each clustering results of the frequency analyzed training data set, wherein the misclassification rate indicates a rate where data to be clustered into the same class is clustered into different class; and
select a clustering result as a clustering model, wherein the clustering model is selected in accordance with the misclassification rate.

2. The data analysis device according to claim 1 wherein the at least one processor is further configured to process the instructions to generate a determination model of data sets by performing machine learning process using the clustering model.

3. The data analysis device according to claim 2, further comprising a storage configured to store the condition associated with the selected clustering result.

4. The data analysis device according to claim 2,
wherein the at least one processor is further configured to perform the frequency analysis on input data under the condition associated with the selected clustering result, and
determine whether the frequency analyzed input data is included in a predetermined class using the determination model.

5. The data analysis device according to claim 2, wherein the processor is further configured to
perform the machine learning process using data obtained from converting the frequency analyzed training data set into a matrix.

6. The data analysis device according to claim 2, wherein the machine learning process is performed using a deep learning algorithm.

7. The data analysis device according to claim 1, wherein the training data set is vibration data.

8. The data analysis device according to claim 7, wherein the predetermined class is a class that indicates an anomaly of the vibration data.

9. The data analysis device according to claim 1, wherein the condition includes a combination of an analysis target range, a time condition, and a frequency condition.

10. A data analysis method comprising:
performing frequency analysis, under each of a plurality of conditions, on a training data set;
clustering each of the frequency analyzed training data pieces into a number of classes of frequency analyzed training data; set into a predefined group, wherein the frequency analyzed training data set is analyzed under each of the plurality of conditions;

calculating a misclassification rate for each clustering results of the frequency analyzed training data set, wherein the misclassification rate indicates a rate where data to be clustered into the same class is clustered into different class; and selecting a clustering result as a clustering model, wherein the clustering model is selected in accordance with the misclassification rate.

11. The data analysis method according to claim 10, further comprising generating a determination model of data sets by performing machine learning process using the clustering model.

12. A non-transitory computer-readable recording medium having recorded therein a data analysis program causing a computer to execute:

frequency analysis processing of performing frequency analysis, under each of a plurality of conditions, on a training data set;

cluster analysis processing of clustering each of the frequency analyzed training data set into a predefined group, wherein the frequency analyzed training data set is analyzed under each of the plurality of conditions;

calculation processing of calculating a misclassification rate for each clustering results of the frequency analyzed training data set, wherein the misclassification rate indicates a rate where data to be clustered into the same class is clustered into different class; and selection processing of selecting a clustering result as a clustering model, wherein the clustering model is selected in accordance with the misclassification rate.

13. The medium according to claim 12, further causing the computer to execute generation processing of generating a determination model of data sets by performing machine learning process using the clustering model.

* * * * *